April 2, 1968 D. G. BASTIAN 3,375,914

POWER DRIVEN TYPE BAR ACTUATING MECHANISM AND CAM THEREFOR

Filed Dec. 28, 1966 5 Sheets-Sheet 1

INVENTOR.
DONALD G. BASTIAN

BY John A. Harvey
ATTORNEY

POWER DRIVEN TYPE BAR ACTUATING MECHANISM AND CAM THEREFOR

Filed Dec. 28, 1966

April 2, 1968 D. G. BASTIAN 3,375,914

POWER DRIVEN TYPE BAR ACTUATING MECHANISM AND CAM THEREFOR

Filed Dec. 28, 1966 5 Sheets-Sheet 3

April 2, 1968 D. G. BASTIAN 3,375,914

POWER DRIVEN TYPE BAR ACTUATING MECHANISM AND CAM THEREFOR

Filed Dec. 28, 1966

5 Sheets-Sheet 4

April 2, 1968 D. G. BASTIAN 3,375,914

POWER DRIVEN TYPE BAR ACTUATING MECHANISM AND CAM THEREFOR

Filed Dec. 28, 1966

5 Sheets-Sheet 5

3,375,914

POWER DRIVEN TYPE BAR ACTUATING MECHANISM AND CAM THEREFOR

Donald G. Bastian, Rochester, N.Y., assignor to Friden, Inc., a corporation of Delaware Filed Dec. 28, 1966, Ser. No. 605,311
16 Claims. (Cl. 197—17)

ABSTRACT OF THE DISCLOSURE

A power drive mechanism for a typewriter, adapted for operation automatically at high typing rates, has each type bar mechanically coupled through a new pivotal and reciprocal latch member to a drive bell crank structure. The latch member is normally pivotally spring biased to latched position at which it latches the type bar in its position of rest. Reciprocal bell crank drive of the latch member pivotally unlatches it for reciprocal motion to move the type bar to type impression position after which the latch member and type bar are permitted to return by spring bias to their latched and rest positions. Each drive bell crank is mechanically coupled to a second associated bell crank which is selectively and angularly reciprocated by a cam of approximately elliptical configuration. This cam is normally latched against rotation with a minor axis peripheral segment slightly spaced from the conventional power drive roll, but is key-lever unlatched into driven engagement with the power roll. Each such engagement effects power-roll drive of the cam through slightly less than an entire 180° angle of cam rotation.

The present invention relates to power driven type bar actuating mechanisms for typewriters and, more particularly, to such mechanisms suitable for operation at high typing rates.

The widespread preparation of typed documents either in original form or with essentially identical content to an earlier original may be accomplished rapidly and at low cost by the use of typewriters automatically controlled in operation by data and functional control information supplied from a data source such as a punched tape reader. Typical examples of typewriter-reader structures for this purpose are disclosed in the U.S. Patent No. 2,700,447, granted Jan. 25, 1955 to Edwin O. Blodgett and U.S. Patent No. 2,905,298, granted Sept. 22, 1959 to Edwin O. Blodgett and Wilbur C. Ahrns. The operating print-reproduction speed limitation in such automatically controlled typewriters is established by the operating rate of the typewriter printing mechanism, and particularly by the maximum rate at which any given type bar may be moved from a position of rest to a type impression position and returned to its position of rest. The frequent necessity to reproduce repetitively occurring alphanumeric characters and symbols constitutes a factor limiting the maximum type reproduction rate of the typewriter to that at which a single type bar can be operated in repetitive type-reproduction manner. This limitation has been effectively removed by an improved code translator structure disclosed in a Donald G. Bastian pending application Ser. No. 582,134, filed Sept. 26, 1966 entitled "Repeat-Character-Delay Code Translator," or by a code translator system disclosed in a pending David F. Frick application Ser. No. 582,061, filed Sept. 26, 1966, entitled "Repeat-Character Delay Code Translator System," both of which applications are assigned to the same assignee as the present application. Both of the structures disclosed in the latter applications permit an increase in the typing rate to that limited only by the possible overlapping of two adjacent type bars moving simultaneously. Such overlapping is reduced, and the permissible print reproduction rate thus increased, to the extent that there is a reduction in the time required for any given type bar to move from rest position to type-impression position and return to a stable rest position.

It is an object of the present invention to provide a new and improved power drive actuating mechanism for functional drive of a power driven typewriter, and one enabling attainment of faster typing rates than heretofore readily attainable.

It is a further object of the invention to provide a power driven type bar actuating mechanism attaining more positive power drive of a type bar from a position of rest to a type impression position accompanied by more positive spring-bias return of the type bar to its position of rest, and one wherein the power drive force and spring-bias return force each accelerate motion of the type bar earlier in its operational cycle thereby to enable substantial improvement in the rapidity of type bar cyclic operation.

It is an additional object of the invention to provide an improved power driven type bar actuating mechanism utilizing type bar mechanical actuating components having reduced mass contributing to more rapid type bar operations and having simplified yet sturdy and reliable construction contributing to reduced fabrication and maintenance costs.

It is yet a further object of the invention to provide a power driven type bar actuating mechanism of simplified and improved yet durable construction exhibiting high reliability of operation with minimized maintenance attention over prolonged operational periods.

It is an additional object of the invention to provide a power drive actuating mechanism for functional drive of a power driven typewriter which incorporates a novel power drive cam of sturdy construction yet minimized weight and having an improved approximately elliptical cam configuration effective to attain power roll drive of the cam through substantially complete 180° angles of cam rotation thereby to insure more consistent and reliable cam operation.

Other and further advantages of the invention will appear as the detailed description thereof proceeds in the light of the drawings forming a part of this application, and in which.

Figures 1, 2, 3:
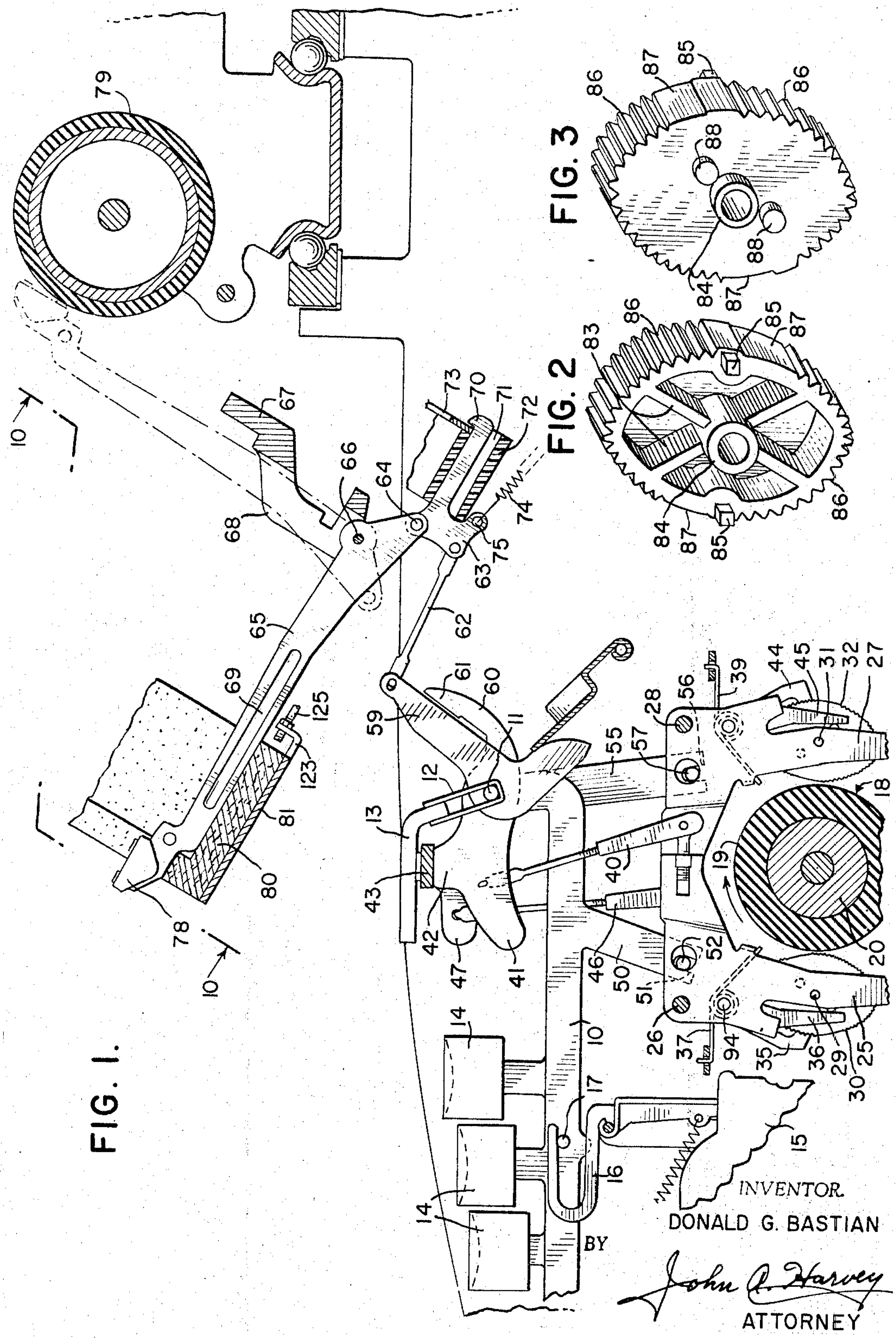
FIG. 1 is a vertical sectional view through the central segment of a typewriter structure embodying the present invention.
FIGS. 2 and 3 illustrate the construction and configuration of a cam element employed in the FIG. 1 construction.

And FIGS. 10–15 illustrate the construction of a guide member and rubber cushioned basket frame used in the FIG. 1 construction and the manner in which these components are arranged and supported in a typewriter structure embodying the invention.

Referring now more particularly to FIG. 1, the typewriter structure shown includes a plurality of conventional key levers 10 which are pivotally supported on a rod 11 carried by an elongated and laterally slotted U-shaped bracket 12 secured to a cross member 13 extending between and affixed to the side frame members of the typewriter. The forward ends of the key levers 10 are pivotally guided by an elongated and laterally slotted guide member affixed to the side frame members of the typewriter, and are biased to a non-operated position by individual bias springs all as shown more particularly in the aforementioned Blodgett Patent No. 2,700,421 but not here shown for simplicity. Each key lever 10 may be manually operated by manual manipulations of key buttons 14, or may be automatically operated by a code translator 15 having the construction shown in the last mentioned Blodgett patent or preferably having the construction disclosed in the aforementioned Bastian application. The translator 15 includes a plurality of seekers 16 individual to the key levers 10 and individually engaging a short stud 17 affixed to the side of each key lever, each such seeker being code selectable for power driven reciprocal motion to effect a corresponding selective key lever operation.

The typewriter also includes a conventional power drive roll 18 journaled for constant-velocity rotation about its axis and having a friction drive peripheral surface 19 conventionally provided by a rubber sleeve covering a metallic roll core 20. A plurality of front bell cranks 25 are pivotally supported in alignment on a rod 26 fixedly secured in the side frames of the typewriter and positioned parallel to and forwardly of the power roll 18. A similar row of rear bell cranks 27 are similarly pivotally supported in alignment by a rod 28 likewise secured between the side frames of the typewriter and positioned parallel to and rearwardly of the power roll 18. Each forward bell crank 25 has a shaft 29 affixed between the sides of a depending arm thereof for rotational support of a cam 30 more fully described hereinafter. Each rear bell crank 27 similarly has a depending arm shaft 31 which rotationally supports a cam 32 similar to the cam 30. Each of the front bell cranks 25 pivotally supports a releasable stop member 35 and a cam-rotational impulse member 36 both of which are described more fully hereinafter. Each front bell crank 25 is biased by a spring 37 toward the power roll 18. Each releasable stop member 35 operates to halt rotational motion of the associated cam 30 in a manner which will be described more fully hereinafter and at a cam position such that an elliptical minor axis of the cam is substantially presented to the power roll 18. For this position of the cam 30, the peripheral cam surface is spaced a short distance from the peripheral drive surface of the power roll 18 by limiting the inward angular motion of the associated bell crank 25 toward the power roll 18 under bias force of the spring 37. This limitation on the inward angular motion of each front bell crank 25 is established by a link member 40 individual to such bell crank and which mechanically connects a horizontal arm of the bell crank 25 to an associated bell crank arm 41 pivotally supported on the shaft 11 and having a projecting heel portion 42 which engages a stop bar 43 supported on the cross member 13.

The rear bell cranks 27 are provided with similar releasable cam stop members 44 and cam impulse members 45 and are similarly biased by springs 39 and connected by link members 46 to individual bell cranks 47 pivotally supported on the rod 11.

Approximately half of the key levers 10 are provided with depending projections 50 having an end slot 51 which cooperates with a pin 52 provided on an individual cam stop member 35 and by which movement of a key lever 10 to operated position releases the associated stop member 35 to permit initial rotation of the associated cam 30 by the associated impulse member 36 to bring the frictional drive peripheral cam surface into engagement with the peripheral frictional drive surface of the power roll 18, this cam release operation being described more fully hereinafter. The remaining key levers 10 likewise are each provided with a depending projection 55 having a slotted end 56 engaging a pin 57 on an associated stop member 44 of an associated rear cam 32.

Upon manual actuation of a key lever 10 to effect release of a front cam 30 or rear cam 32, the associated impulse member 36 or 45 rotates the cam through an initial angle of approximately 5° to engage its peripheral drive surface with the power roll 18. The cam is thereupon rotationally driven by the power roll and in rotating pivots the depending arm of the associated front bell crank 25 or rear bell crank 27 outwardly away from the power roll. After the driven cam rolls over its major-axis end portion, the depending arm of the bell crank is pivotally returned by the bias force of its associated spring 37 or 39 toward the power roll. The return bell crank motion is halted by engagement of the heel portion 42 of its associated bell crank 41 or 47 with the stop bar 43. During this return motion of the bell crank, the spring-bias force exerted on it maintains the associated cam 30 or 32 in continuous driven engagement with the power roll 18 so that the cam after its initial impulse-member rotation continues to be rotationally driven through substantially all of the remainder of a 180° angular rotation. At the time the bell crank inward motion is halted, the associated stop member 35 or 44 halts rotational motion of the associated cam 30 or 32 to leave the cam peripheral surface slightly spaced from the surface of the power roll 18 as earlier explained. This reciprocal angular motion of a front bell crank 25 or rear bell crank 27 operates through the associated link member 40 or 46 to move the associated bell crank 41 or 47 through a corresponding reciprocal cycle of angular motion. The bell cranks 41 and 47 are preferably supported on the rod 11 in side-in-side or sandwiched relation to a plurality of actuating bell cranks 59 also pivotally supported on the rod 11. The bell cranks 41 and 47 each have arms 60 laterally offset at their ends and terminating in an elongated end portion 61 drivingly engaging an edge surface portion of an associated actuating bell crank 59 to transmit the counterclockwise angular motion of a bell crank 41 or 47 (as seen in FIG. 1) to a corresponding counterclockwise angular drive of the associated bell crank 59 as more fully disclosed and described in a pending application of Edwin O. Blodgett, Ser. No. 553,911, filed May 31, 1966, entitled "Power Driven Type Bar Actuating Mechanism," and assigned to the same assignee as the present application.

In the following description, the operating linkage structure and mode of actuation applicable to a representative type bar will be described and it will be understood that the same operating structure and mode of type bar actuation is provided for each of the other type bars conventionally included in the curvilinear type basket of the typewriter.

A link member 62 is pivotally connected at one end to the end of an associated actuating bell crank 59, and is pivotally connected at its opposite end to an individual latch member 63. The latter in turn is pivotally connected at a point 64 on the end of a type bar 65, which is pivotally supported intermediate its ends on a wire 66 carried by a curvilinear type basket 67 having slots 68 to receive and guide each type bar 65 as the latter is pivotally moved in a manner presently to be explained. Each type bar is fabricated of lesser width and lighter stock material than has heretofore been the conventional practice, thus to reduce its mass and enable a higher cyclic rate of operation, and is stiffened longitudinally by a longitudinal stiffening rib 69 struck out laterally from its side as shown. Each latch member 63 includes a projecting hook-end latch portion 70 which is positioned within and pivotally and reciprocally guided by an individual elongated bore 71 of a curvilinear guide member 72 more fully described hereinafter. The latch member 63 is conventionally fabricated from sheet steel stock which is temperature-hardened to minimize wear, and its projecting latch portion 70 thus will have a rectangular cross-sectional configuration in planes transverse to its longitudinal dimension. The bores 71 of the guide member 72 have the same transverse cross-section as the latch portion 70. The guide member 72 has affixed thereto an arcuate member 73 of hardened sheet metal with an outer surface normal to the bores 71 and with its lower edge arranged for latchable engagement with the hook-end portion 70 of the latch members 63. A helical spring 74, fixedly anchored at one end by means not shown and having its opposite end of hooked configuration engaging an aperture 75 provided in an individual latch member 63, normally spring-biases the individual latch members 63 to engage their projecting hooked-end latch portion 70 with the member 73. As shown in FIG. 1, the point 64 of pivotal connection of the latch member 63 to the end of the type bar 65 lies to one side of the projecting latch portion 71 of the member 63, and the pivotal connection of the link member 62 to the latch member 63 lies on the opposite side of the projecting latch portion 70. The helical wire spring 74 is connected to the latch member 63 at a point thereon lying outside of the pivotal connecting points last mentioned but nearer the pivotal connecting point of the link member 62.

Thus angular driven motion of the bell crank 59 in counterclockwise direction as seen in FIG. 1 and in the manner earlier described operates through the link member 62 initially to pivot the projecting latch portion 70 of the latch member 63 out of latching engagement with the member 73 after which further counterclockwise motion of the bell crank 59 moves the latch member 63 to the left as seen in FIG. 1 and against the force of the bias spring 74. As this movement of the latch member 63 progresses, further unlatching pivotal motion of the latch member is restrained by engagement of its projecting latch portion 70 with the bottom wall surface of the slot 71 of the guide member 72. The slot 71 is sufficiently wide in the vertical plane of the latch portion 70 that during further movement of the latch member 63 to the left, with continued counterclockwise motion of the bell crank 59, a certain amount of lateral displacement of the latch member 63 is permitted sufficient for its pivotal point 64 on the type bar 65 to follow an arcuate path about the pivot wire 66 as a center. This continuing leftward motion of the latch member 63 causes the type bar 65 to move from its position of rest shown in solid lines to its type impression position shown in broken lines and at which position a type slug 78 carried on the remote end of each type bar 65 impacts and presses a type ribbon (not shown) against a sheet of paper wrapped in conventional manner about a typewriter platen 79. As explained in the aforementioned Blodgett application, it is the inertia of the type bar 65 and associated mechanical drive structure which carries the type bar through a small terminal range of motion to its type impression position and at this time the drive bell crank 41 or 47 has begun its return angular motion toward engagement with the stop member 43.

After the type bar 65 has reached and halted at its type impression position, the helical wire spring 74 moves the latch member 63 to the right as shown in FIG. 1. This return movement of the latch member continues until the actuating bell crank 59 and type bar 65 are restored to their positions of rest. As the type bar 65 reaches its position of rest and has its motion decelerated by its engagement with a wide rubber cushion 80 carried by a basket frame 81, the spring 74 pivots the latch member 63 once more to move its projecting latch portion 70 into latched engagement with the member 73 thereby latching the type bar 65 in its position of rest and preventing any rebound motion thereof. When this occurs, operation of a further type bar may have already begun thus to attain a maximized typing rate by permissible overlapping of two adjacent type bars moving simultaneously although in opposite angular directions.

Such maximized typing rate is enhanced in a structure embodying the invention by reason of the simplified and relatively small mass latch member 63 which mechanically interconnects the link member 62 and the type bar 65, thereby reducing the time required to accelerate and move the type bar 65 from its position of rest to its type impression position and to return it to its position of rest. This more rapid actuation of the type bar 65 through its reciprocal cycle of angular motion is enhanced by the more positive, more direct and earlier applied type-bar drive force exerted by the actuating bell crank 59 through the link member 62 and latch member 63. It is also enhanced by the more positive, more direct and earlier applied restoring force exerted by the bias spring 74 on the type bar 65 through the latch member 63. The small mass of the latch member 63 has the further important advantage of more rapid positive latching of the type bar 65 in its position of rest and thus prevent any rebound motion thereof. An important factor in attaining such maximized typing rate is the positive drive of the cams 30 and 32 by the power roll 18 to substantial completion of each 180° angular cam rotation, thus insuring more consistently reliable cam operation notwithstanding possible oxidation or gumming of the cam pivot lubricant and the effect of dirt particles which may collect on the cam surfaces and tend to cause it to stick as supported by the front bell cranks 25 and rear bell cranks 27. This cam reliability of operation is to be contrasted with prior cam constructions and cam actuation wherein the cam was fabricated of metal with substantial mass and the cam was power driven over somewhat less than 90° of cam rotation with reliance being placed upon the cam mass to continue its rotation on to the end of its rotational motion.

FIGS. 2 and 3 illustrate more clearly the configuration and construction of the cams 30 and 32. The cam is of relatively rigid construction and is preferably fabricated of a thermo-plastic material, such as a fiber-glass-filled molybdenum polyamide (i.e. that marketed under the trademark Nylatron), by an injection molding process. As earlier mentioned, the cam has an approximately elliptical configuration in planes transverse to its rotational axis. In a representative application, such elliptical configuration is comprised by four 90° cam segments of which the major portions of two diametrically opposing segments are defined by cylindrical segments centered upon axes parallel to and symmetrically spaced from the cam axis by approximately four-tenths the minor-axis cam radius and lie in a plane at 45° from an axial plane including such radius, and the major portions of the other two diametrically opposing cam segments are defined by cylindrical segments centered upon axes parallel to and symmetrically spaced from the cam axis by approximately eight-tenths the minor-axis cam radius and lie in the axial-radius plane. To minimize the cam mass, the cam is fabricated of cup-shaped configuration as illustrated in FIG. 2, preferably has relatively thin though rigid side and base walls, and utilizes radial stiffening flanges 83 integrally formed and extending radially to join spaced points on the cam walls with an axial hub portion 84 of cylindrical configuration also integrally formed. The cam includes sidewise extending stop projections 85 centered upon an axial plane which includes the minor-axis cam radius, and has a frictional drive peripheral surface comprised by small toothed surface indentations 86 (shown in exaggerated size in FIGS. 2 and 3 for clarity of illustration) extending parallel to the axis of cam rotation and also extending substantially completely around the periphery of the cam except for short diametrically opposed smooth peripheral surface segments 87 located adjacent the cam minor-axis and of approximately 20° angular length. As shown more clearly in FIG. 3, the exterior surface of the cam base is provided with two cylindrical projections 88 which are symmetrically spaced from the cam axis in a plane at approximately 45° to an axial plane which includes the cam minor-axis. The projections 88 cooperate with the cam-rotational impulse members 36 and 45 (FIG. 1) in a manner presently to be explained.

Figures 4, 5, 6, 7, 8, 9:
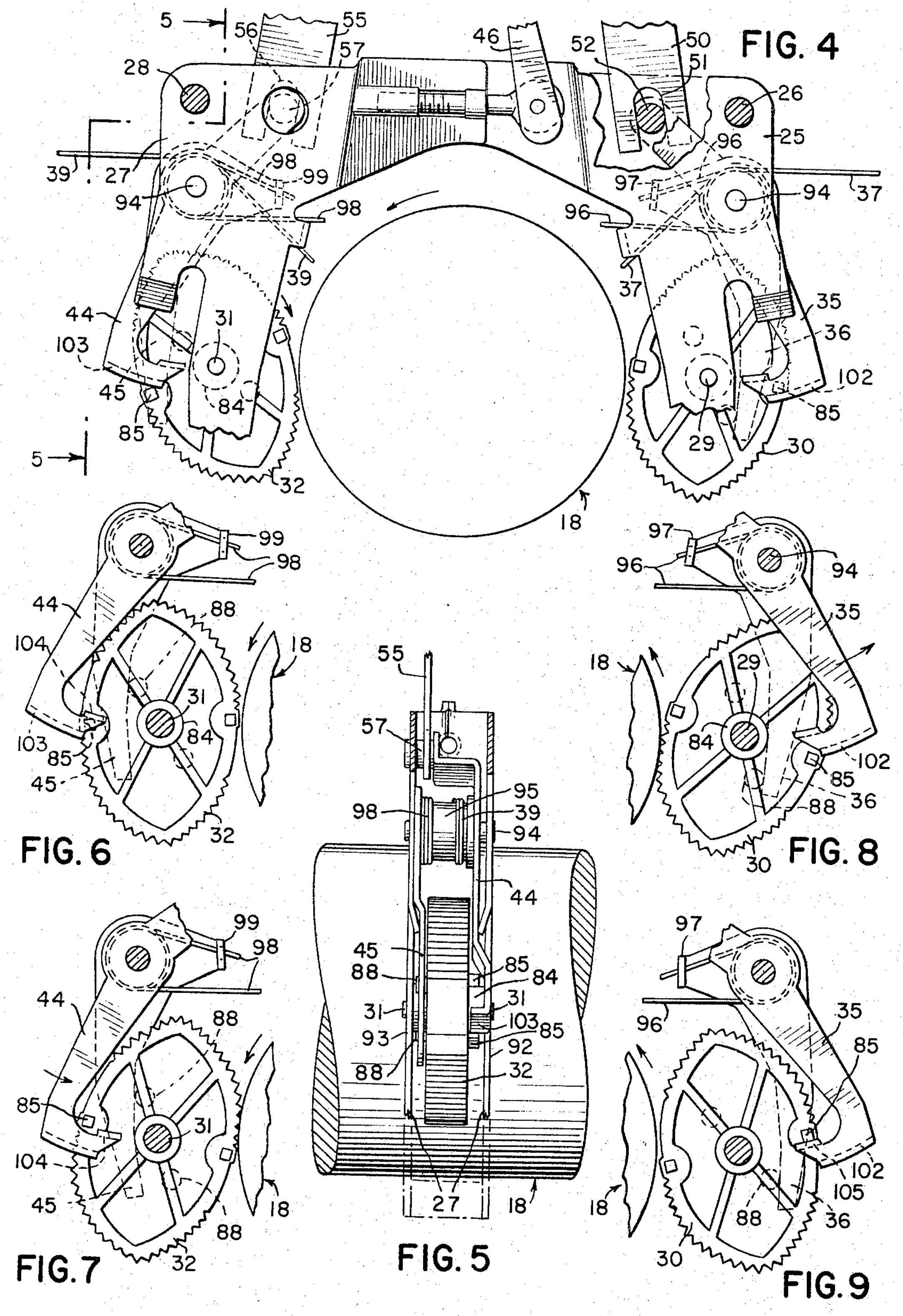
FIGS. 4 and 5 are fragmentary elevational and end views of a power drive actuating mechanism employed in the FIG. 1 construction, these views being enlarged for clarity of illustration of certain constructional features thereof.
FIGS. 6–9 are fragmentary elevational views used in describing the operation of the power drive actuating mechanism.

FIGS. 4 and 5 are enlarged fragmentary views illustrating the construction of the front bell cranks 25 and rear bell cranks 27 with their associated cams 30 and 32, their stop members 35 and 44, and their cam-rotational impulse members 36 and 45. As indicated by the reference numerals applied to the various elements shown in FIG. 4, the view of this figure is taken in opposite direction to that of FIG. 1 in order to illustrate the structure more clearly. As shown more clearly in FIG. 5, the bell cranks 27 (and the bell cranks 25) have depending arms of forked construction providing spaced arm walls 92 and 93 which carry the cam support stub shaft 31. A pin 94 extending between and secured to the bell crank arm walls 92 and 93 pivotally supports the stop member 35 of each bell crank 25 and the stop member 44 of each bell crank 27, and likewise pivotally supports the rotational impulse member 36 of each bell crank 25 and the corresponding member 45 of each bell crank 27. An enlarged sleeve 95, supported on the pin 94 intervening between a stop member 35 or 44 and its associated impulse member 36 or 45, has several turns of the bell crank bias spring 37 or 39 wrapped about it. The sleeve 95 also supports several turns of a spring 96 which engages an apertured and overturned end portion 97 of the impulse member 36 to bias this member toward the rotational axis of the cam 30 of the bell crank 25, a similar spring 98 engaging an apertured overturned end portion 99 of the impulse member 45 similarly biasing the latter toward the rotational axis of the cam 32 associated with the bell crank 27.

The cam 30 is illustrated in FIG. 4 in the position at which it is halted by the lock member 35 after completion of a half cycle of cam revolution. At this time, one of the stop projections 85 of the cam engages an overturned end portion 102 of the stop member 35 leaving the cam with a small space between its peripheral surface and that of the power roll 18. The cam 32 in FIG. 4 is illustrated by way of example as also halted by its associated lock member 44, but in this instance the latter is shown in the position which it would have in the event that the key lever which last actuated the stop member 44 to its cam releasable position remains depressed so that the stop member 44 remains in its released position. In such event, a stop projection 85 of the cam 32 engages the lower surface of an overturned end portion 103 on the stop member 44 to halt the cam rotation again with its peripheral surface spaced a short distance from that of the power roll 18. When the key lever is released to its non-operated position, the stop member 44 is moved by the key lever projection 55 outwardly to a position illustrated in FIG. 6. The stop projection 85 is disengaged from the overturned end portion 103 of the stop member 44 so that the cam 32 may now be rotated through a small angle by engagement of the spring-biased impulse member 45 with a projection 88 of the cam, and this rotation is halted when the stop projection 85 of the cam engages an inturned flange 104 of the stop member 44. During this small angular rotation of the cam 32, its peripheral surface remains spaced by a small distance from the peripheral surface of the power roll 18. Now upon the next operation of the associated key lever, and as illustrated in FIG. 7, the stop member 44 is rotated counterclockwise as seen in FIG. 7 by the depending projection 55 of the operated key lever and this moves the inturned flange 104 of the stop member 44 out of engagement with the stop projection 85 of the cam. The cam impulse member 45 transmits the bias force of the spring 98 to the projection 88 of the cam to rotate the cam through a small initial angle to a position at which the peripheral surface of the cam engages the peripheral surface of the power roll 18. The latter thereupon drives the cam through substantially a half revolution of cam rotation, during which time the associated bell crank 27 is angularly pivoted through a cycle of pivotal motion as earlier described. As the cam rotates, a further projection 88 on the same 32 engages the impulse member 45 to move it in clockwise direction as seen in FIG. 7 and against the bias force of its associated spring 98. The impulse member 45 is thus positioned to effect subsequent small rotational movements of the cam 32 by the impulse member as heretofore described. The rotational movement of the cam is halted by engagement of a stop projection with the portions 103 or 104 of the stop member 44 as earlier described.

FIG. 8 illustrates key lever actuation of the stop member 35 in a counterclockwise direction as seen in FIG. 8 and to a position at which its inturned end portion 102 moves to disengaged position with a stop projection 85 of the associated cam 30. The impulse member 36 by engagement with a projection 88 of the cam 30 thereupon rotates the latter through a small angle to engage the peripheral drive surface of the cam with the peripheral surface of the power roll 18 to initiate a half revolution of cam drive. Should the associated key lever remain in operated position to retain the stop member 35 in a position illustrated in FIG. 8, a stop projection 85 on the cam 30 ultimately engages an inturned flange 105 of the stop member 35 as illustrated in FIG. 9 to halt the cam rotation with the cam peripheral surface spaced a small distance from that of the power roll 18. Upon release of the associated key lever to non-operated position, the associated impulse member 36 by engagement with a projection 88 of the cam 30 rotates the cam through a small angle to the position illustrated in FIG. 4 where a stop projection 85 of the cam engages the inturned end portion 102 of the stop member 35 again to halt rotation of the cam with its peripheral surface spaced a small distance from that of the power roll 18.

Figures 10, 11, 12, 13:
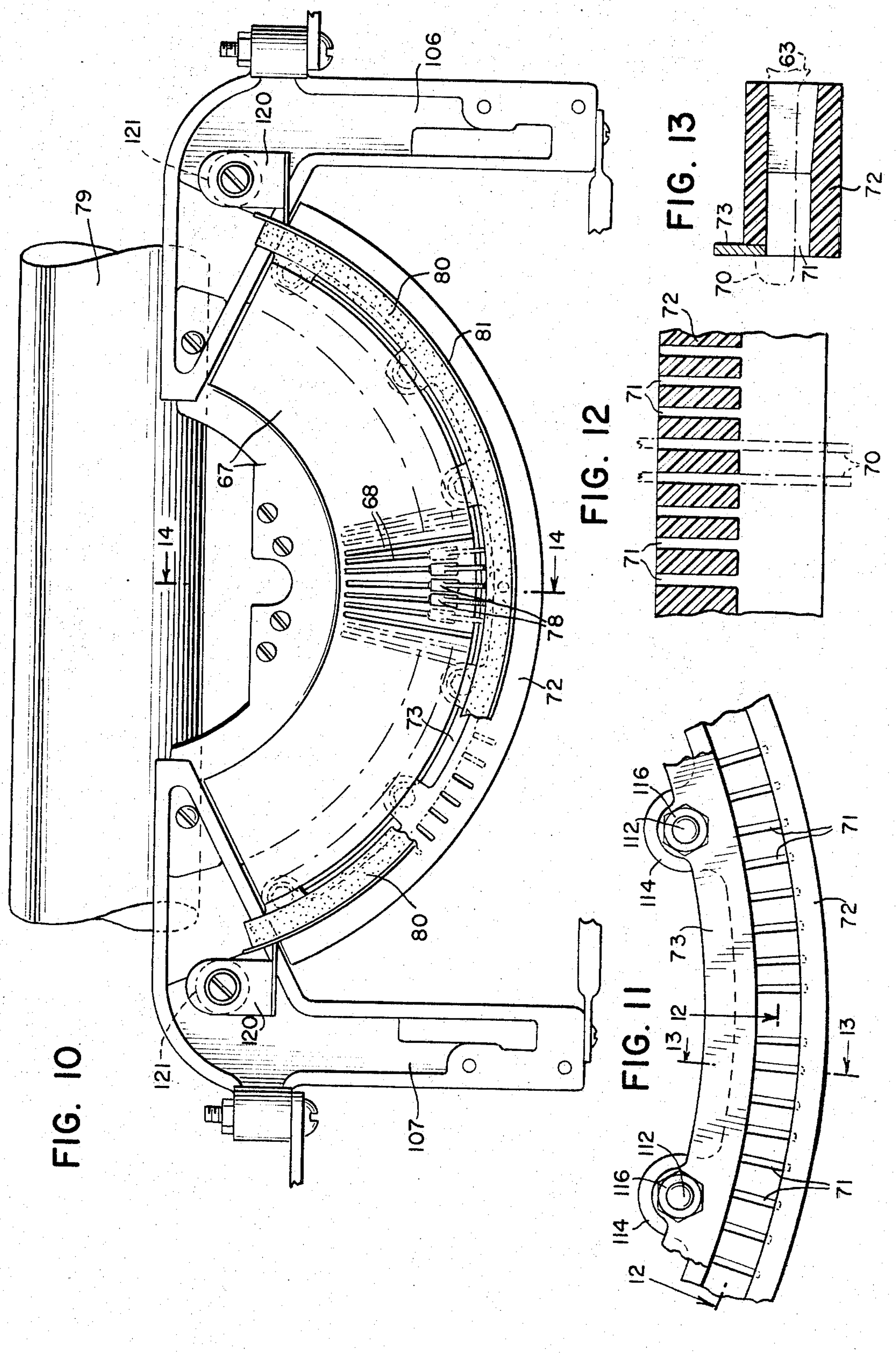
Figure 14:
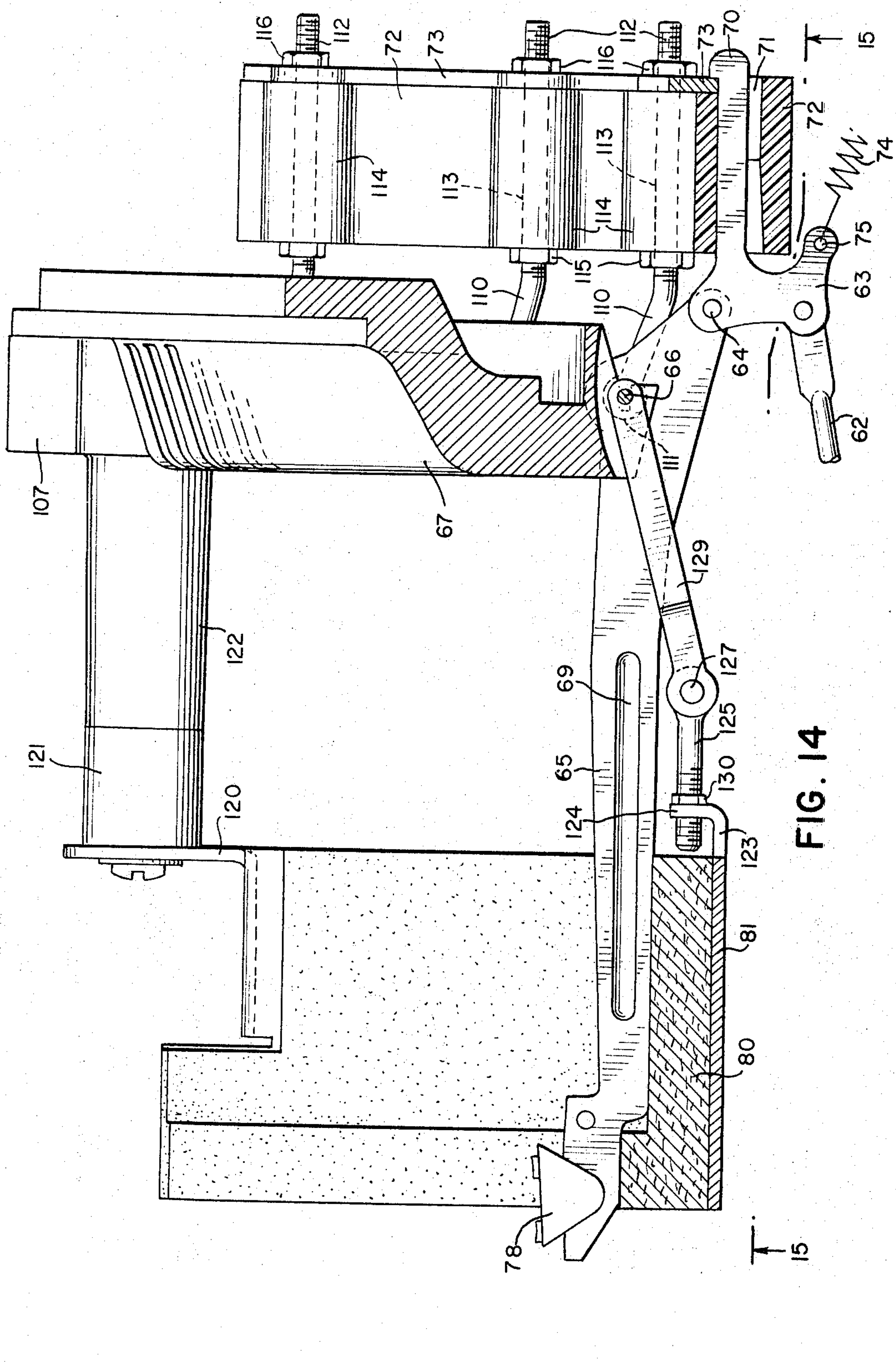
Figure 15:
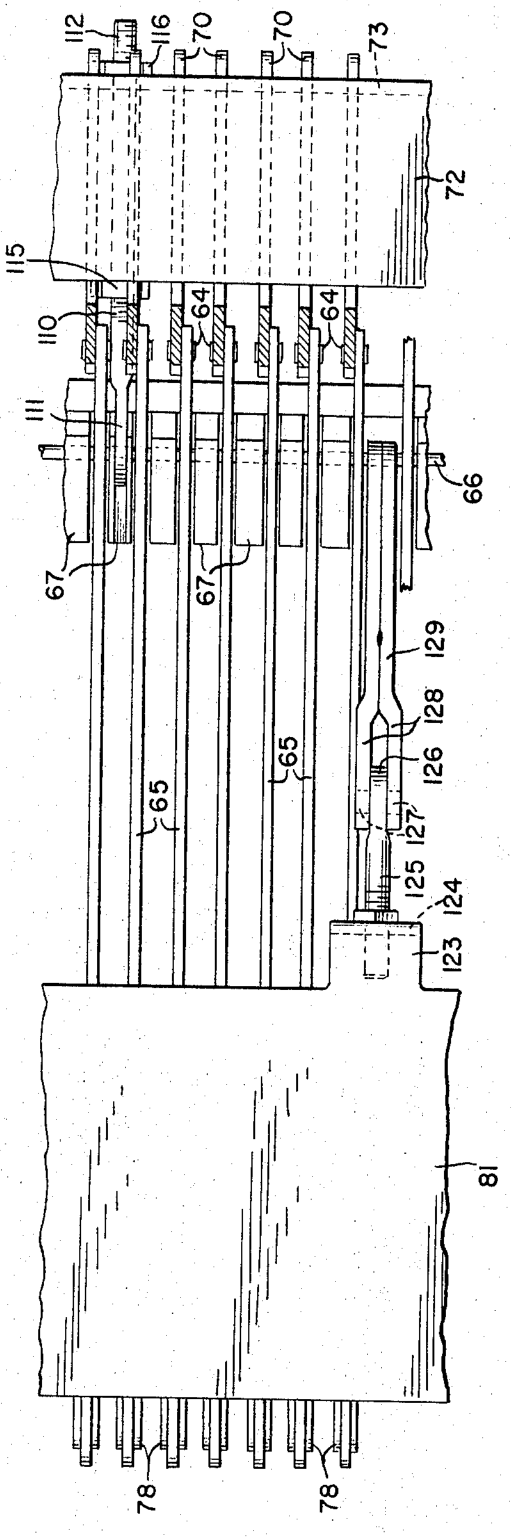

The type basket 67 is supported in conventional manner on side castings 106 and 107 as illustrated in FIG. 10, the latter castings in turn being secured in conventional manner to the main frame of the typewriter (not shown). The relative position of the latch guide member 72 with its arcuate latch-engageable member 73 is also illustrated in FIG. 10, and a fragment of these members is shown in FIG. 11 more clearly to illustrate the spaced latch-member guide bores 71 of rectangular cross-sectional configuration illustrated by the cross-sectional views of FIGS. 12 and 13. As shown more clearly in FIG. 13, the vertical width of each latch-guide bore 71 is increased slightly toward the front end of the bore to permit lateral displacement of the latch member 63 as it operates its associated type bar to type impression position. The guide member 72, as illustrated in the enlarged fragmentary cross-section views of FIG. 14, is supported upon a plurality of spaced studs 110 each having a flattened forward end 111 apertured to receive the wire 66 for support thereon and each having a linear externally threaded body portion 112 which extends through aperture 113 provided in each of generally cylindrical spaced bosses 114 integrally formed on the inner surface of the guide member 72 as shown. The body portion 112 of the studs 110 also extends through apertures (not shown) of the arcuate member 73 for support of the latter on the studs 110. The position of the guide member 72 and arcuate member 73 along the length of the stud body portion 112 is adjustable by adjustments of an inner clamp nut 15 and an outer clamp nut 116 which also clamp the guide member 72 and arcuate member 73 in assembled relation. The purpose of this position adjustment is to adjust the position of the latch member 63 and the corresponding latched position of rest of the type bar 65.

FIG. 14 also illustrates the manner in which the basket frame 81 with its affixed rubber cushion 80 is supported by integrally formed and outturned brackets 120 upon stiff rubber shock mount members 121 supported in turn upon studs 122 formed integral with the side castings 106 and 107. To assist in attaining maximum length of engagement between the inner surface of the rubber cushion 80 and the edge of each type bar 65 in the rest positions of the latter, the position of the basket frame 81 is angularly adjustable about its support on the shock mount members 121. To this end, a flange 123 centrally located on the basket frame 81 has an upturned end 124 apertured and internally threaded to receive a threaded rod 125. The latter has a flattened forward end 126, more clearly shown in FIG. 15, having integrally formed and laterally extending coaxial studs 127 by which the rod 125 is pivotally secured between the forked end 128 of a link member 129 apertured at its forward end for support on the wire 66. The forked end 128 of the link member 129 is spread apart to release the studs 127 and permit the angular posiion of the basket frame 81 to be adjusted by threading the rod 125 into or out of the threaded aperture of the upturned end 124 of the flange 123, after which adjustment a lock nut 130 is tightened against the flange end 124.

It will be apparent from the foregoing description of the invention that a typewriter power drive actuating mechanism embodying the invention enables attainment of faster typing rates than heretofore readily attainable, typing rates as high as 15 characters per second being readily accomplished whereas previous typing rates have not exceeded approximately 10 characters per second. It does so by reason of its use of a latch member of simple construction and relatively low mass, which not only performs a type bar at-rest latching function hereinbefore described but also ensures the more direct application of accelerating forces effective more rapidly to move a type bar over a reciprocal angular cycle between its rest and type-impression positions. A power drive actuating mechanism embodying the invention is of simplified yet durable construction exhibiting high operating reliability at hgh typing rates with minimized maintenance attention over prolonged operational periods.

While there has been described a specific form of the invention, it is contemplated that numerous changes may be made without departing from the spirit of the invention.

What is claimed is:

1. A power driven type bar actuating mechanism comprising:

a type bar having impression type on one end and which is pivotally supported intermittent its ends for pivotal motion between type impression and rest positions, an actuating bell crank supported for pivotal motion, latch means including a reciprocally and pivotally movable latch member having a projecting latch portion and being pivotally supported on the other end of said type bar at a point on said latch member lying to one side of said projecting latch portion thereof, spring bias means for biasing said latch member towards a reciprocal-motion-restrained latched position while permitting bias-means-opposed pivotal movement of said member to unlatched reciprocal positions thereof, means including (a) a link member pivotally connected at one end to an arm of said actuating bell crank and pivotally connected at its opposite end to a point on said latch member lying on the other side of said projecting latch portion from said pivotal support point of said type bar; and (b) said latch member; for mechanically coupling said actuating bell crank and said type bar statically to position said latch member in said latched position with accompanying latch-member latching of said type bar in said rest position thereof and dynamically to effect actuating-bell-crank drive motion of said latch member pivotally to unlatched position and reciprocally to move said type bar towards said type impression position followed by return of said type bar to said rest position thereof effected by said spring bias means, wherein said spring bias means is fixedly anchored at one end and connected at its opposite end to a point on said latch member lying outside of said pivotally-supported and link-connected points thereof but nearer said link-connecting point, and power actuating means selectively mechanically coupled to said actuating bell crank for selective power drive movement thereof in at least one angular direction dynamically to move said type bar to said type impression position thereof and thereafter permit spring bias means return movement of said latch member and said type bar to said latched and rest positions thereof.

2. A power driven type bar actuating mechanism according to claim 1 wherein said latch means includes a fixedly supported guide member having a bore with a latch surface at one end of said bore and normal thereto, and wherein said latch member includes a projecting hook-end latch portion positioned within and pivotally and reciprocally guided by the bore of said guide member for latchable engagement and disengagement with said latch surface upon reciprocal pivotal movement of said latch member.

3. A power driven type bar actuating mechanism according to claim 2 wherein said latch member projecting portion and the guide bore of said guide member are each of rectangular cross-section in planes normal to a longitudinal median plane thereof.

4. A power driven type bar actuating mechanism according to claim 1 which includes resilient cushion means uniformly engageable by a substantial edge length of said one end of said type bar and compressible to decelerate return movement of said type bar to its latched position of rest.

5. A power driven type bar actuating mechanism according to claim 1 wherein said power actuating means includes a power drive bell crank supported in side-by-side relation to said actuating bell crank for common coaxial pivotal motion therewith, said drive bell crank having an offset arm terminating in an elongated edge surface positioned in abutting driving engagement with an edge surface portion of said actuating bell crank to effect said power drive movement thereof in said one angular direction.

6. A power driven type bar actuating mechanism according to claim 5 wherein said drive bell crank terminates drive angular motion in said one angular direction and begins movement in opposite angular direction prior to completion of angular motion of said actuating bell crank in said one angular direction to permit bias-means return of said type bar to its latched position of rest.

7. A power driven type bar actuating mechanism according to claim 6 wherein said drive bell crank has its angular motion controlled by a power-actuating-means driven cam throughout substantially a complete reciprocal angular cycle including said one and opposite angular directions.

8. A power driven type bar actuating mechanism according to claim 1 wherein said power actuating means comprises a power driven roll having a friction drive peripheral surface, a pivotally supported drive bell crank having an arm, means for rotationally supporting on said arm a cam of approximately elliptical cam configuration having a frictional drive peripheral surface and having half-rotation stop projections, means for biasing said drive bell crank toward engagement of said cam with the peripheral surface of said roll, releasable means cooperating with said stop projections for halting said cam each time an elliptical minor axis thereof is substantially presented to said roll and for halting biased angular motion of said bell crank to space the surface of said cam a small distance from the surface of said roll, print-control means selectively operable to release said stop means and including bias means for angularly rotating said cam drivingly to engage the drive peripheral surfaces of said cam and said roll during a substantially complete one-half revolution of said cam angularly to reciprocate said drive bell crank, and means for mechanically coupling said drive bell crank to said actuating bell crank for said power drive movement thereof.

9. A power driven type bar actuating mechanism according to claim 8 wherein said frictional drive peripheral surface of said cam is comprised by small toothed surface indentations parallel to the axis of cam rotation and extending substantially completely around the periphery of said cam.

10. A power driven type bar actuating mechanism according to claim 9 wherein said approximate elliptical configuration of said cam is comprised by four 90° cam segments of which the major portions of two diametrically opposing segments are defined by cylindrical segments centered upon axes parallel to and symmetrically spaced from the cam axis by approximately four-tenths the minor-axis cam radius and lie in a plane at 45° from an axial plane including said radius and the major portions of the other two diametrically opposing cam segments are defined by cylindrical segments centered upon axes parallel to and symmetrically spaced from the cam axis by approximately eight-tenths said radius and lie in said axial-radius plane.

11. A power driven type bar actuating mechanism according to claim 10 wherein the juncture of adjacent ones of said segments at the region of each major-axis cam radius includes a cylindrical incremental segment terminating at its ends substantially in tangential relation to individual ones of said adjacent segments.

12. A power drive actuating mechanism for functional drive of a power driven typewriter comprising a power drive roll journaled for rotation about its axis and having a friction drive peripheral surface, a plurality of bell cranks pivotally supported in alignment on an axis parallel to and lying to one side of said roll and each including an arm having a shaft parallel to and spaced from each said axis and rotationally supporting a cam of approximately elliptical cam configuration with frictional drive peripheral surface, means for biasing each said bell crank toward engagement of its cam with said roll, means including a releasable stop member carried by each said bell crank for halting the cam thereof each time a minor axis of the cam is substantially presented to said roll and for halting biased angular motion of said each bell crank toward said roll to space the surface of the halted cam thereof a small distance from the peripheral surface of said roll, means including a typewriter functional-control member individual to each said stop member and selectably operable to release said each stop member, means operable upon release of said each stop member for angularly rotating the associated cam through a small angle drivingly to engage the peripheral surface of the associated cam with the peripheral surface of said roll throughout a substantially complete one-half revolution of the cam and thereby provide an individual functional-actuation angular drive reciprocation of the associated bell crank and wherein said approximate elliptical configuration of each of said cams is comprised by four 90° cam segments of which the major portions of two diametrically opposed segments are defined by cylindrical segments centered upon axes parallel to and symmetrically spaced from the cam axis by approximately four-tenths the minor-axis cam radius and lie in a plane at 45° from an axial plane including said radius and the major portions of the other two diametrically opposing cam segments are defined by cylindrical segments centered upon axes parallel to and symmetrically spaced from the cam axis by approximately eight-tenths said radius and lie in said axial-radius plane.

13. A power drive actuating mechanism for functional drive of a power driven typewriter according to claim 12 wherein said frictional drive peripheral surface of each of said cams is comprised by small toothed surface indentations parallel to the axis of cam rotation and extending substantially completely around the periphery of said each cam.

14. A power drive actuating mechanism for functional drive of a power driven typewriter according to claim 12 wherein the juncture of adjacent ones of said segments at the region of each major-axis cam radius includes a cylindrical incremental segment terminating at its ends substantially in tangential relation to individual ones of said adjacent segments.

15. A cam drive element for a functional drive actuating mechanism of a power driven typewriter comprising a cup-shaped cam member fabricated of a relatively rigid thermoplastic material and having an approximately elliptical cross-sectional configuration in a plane normal to the cam axis, the peripheral cam surface of said member having an uninterrupted succession of frictional-drive small toothed surface indentations parallel to the axis of said cam member and extending over the major portion of each of two 180° segments of said peripheral cam surface and wherein said cam member is comprised by four 90° cam segments of which the major portions of two diametrically opposing segments are defined by cylindrical segments centered upon axes parallel to and symmetrically spaced from the cam member axis by approximately four-tenths the minor axis cam radius and lie in a plane at 45° from the axial plane including said radius and the major portions of the other two diametrically opposing cam segments are defined by cylindrical segments centered upon axes parallel to and symmetrically spaced from the cam member axis by approximately eight-tenths said radius and lie in said axial-radius plane.

16. A cam drive element for a functional drive actuating mechanism of a power driven typewriter according to claim 15 wherein the juncture of adjacent ones of said segments at the region of each major-axis cam member radius includes a cylindrical incremental segment terminating at its ends substantially in tangential relation to individual ones of said adjacent segments.

References Cited

UNITED STATES PATENTS

| | | | |
|---|---|---|---|
| 677,706 | 7/1901 | Shepard | 197—31 X |
| 677,707 | 7/1901 | Shepard | 197—31 |
| 788,984 | 5/1905 | Young | 197—31 |
| 881,275 | 3/1908 | Young | 197—31 |
| 1,077,005 | 10/1913 | Smathers | 197—17 |
| 1,455,112 | 5/1923 | Crawley | 97—17 |
| 2,201,775 | 5/1940 | Howland et al. | 197—31 |
| 2,489,826 | 11/1949 | Smothers | 197—31 X |
| 2,700,445 | 1/1955 | Blodgett | 197—31 X |
| 3,237,746 | 3/1966 | Meinherz et al. | 197—17 |
| 3,269,509 | 8/1966 | Smith | 197—17 X |

FOREIGN PATENTS

| | | |
|---|---|---|
| 322,099 | 6/1920 | Germany. |

ROBERT E. PULFREY, *Primary Examiner.*

E. S. BURR, *Assistant Examiner.*